United States Patent [19]
Zheng

[11] Patent Number: 5,991,266
[45] Date of Patent: Nov. 23, 1999

[54] QUEUE LENGTH BASED ABR FLOW CONTROL SYSTEM

[75] Inventor: Qin Zheng, Boxborough, Mass.

[73] Assignee: Mitsubishi Electric Information Technology Center America, Inc. (ITA), Cambridge, Mass.

[21] Appl. No.: 08/820,554

[22] Filed: Mar. 19, 1997

[51] Int. Cl.[6] .................................. H04J 1/16; H04J 3/14
[52] U.S. Cl. ........................ 370/229; 370/230; 370/234
[58] Field of Search ...................... 370/229, 230, 370/231, 232, 233, 234, 235, 252, 389, 412, 413, 414, 415, 416, 417, 418, 419, 428, 395, 543

[56] References Cited

U.S. PATENT DOCUMENTS

| | | | |
|---|---|---|---|
| 5,210,744 | 5/1993 | Yamanaka et al. | 370/413 |
| 5,222,108 | 6/1993 | Suzuki | 370/505 |
| 5,400,329 | 3/1995 | Tokurat et al. | 370/232 |
| 5,457,687 | 10/1995 | Newman | 370/232 |
| 5,633,859 | 5/1997 | Jain et al. | 370/234 |
| 5,675,576 | 10/1997 | Kalampoukas et al. | 370/395 |
| 5,701,291 | 12/1997 | Roberts | 370/232 |
| 5,701,292 | 12/1997 | Chiussi et al. | 370/232 |
| 5,706,288 | 1/1998 | Radhakrishnan et al. | 370/418 |
| 5,719,853 | 2/1998 | Ikeda | 370/229 |

*Primary Examiner*—Douglas W. Olms
*Assistant Examiner*—Phirin Sam
*Attorney, Agent, or Firm*—Dirk Brinkman

[57] ABSTRACT

In an ATM network, a traffic management system is provided to allow simple and effective implementation of rate-based available bit rate, or ABR, flow control at ATM switches, with the subject system using an innovative queue length based approach to calculate the cell rate that a source system can use to send cells. In one embodiment, the cell rate is calculated as an exponential function of the cell queue length at a switch, and the rate value is carried back to a source system via resource management, or RM, cells. The exponential rate calculation function provides a large stability region for a network for better flow control performance than other systems, with the subject system being easy to implement in ATM switches.

5 Claims, 7 Drawing Sheets k: arrival time of the k-th RM cell
q(k): queue length of the outgoing link
r(k): arriving cell rate of the connection
a(k): outgoing bandwidth available to the connection
T(k): RM cell period
d(k): feedback delay of the RM cell

QUEUE LENGTH BASED ABR FLOW CONTROL SYSTEM

FIELD OF THE INVENTION

This invention relates to traffic control in a digital communication network and more particularly to an available bit rate, or ABR, flow control implementation at ATM switches to realize effective flow control in ATM networks.

BACKGROUND OF THE INVENTION

In transmission of data over a cell switched digital communication network, such as an asynchronous transfer mode or ATM network, problems arise when multiple sources send data cells at widely varying rates through a switch node or link of the network at an aggregated rate which taxes the ability of that switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists for long periods of time, the buffer storage will be filled to maximum capacity and any additional data must be discarded.

In an effort to minimize such data loss, an available bit rate or ABR flow control scheme has been developed to prevent or inhibit excess data from entering the network. With ABR flow control, the rate at which the data is permitted to enter the network is controlled to not exceed an allowable cell rate, or ACR, and this ACR is adjusted via a feedback signal, usually in a form of resource management, or RM, cells from a network reflecting the congestion of the network. One such ABR flow control scheme is described in an ATM Forum document af-tm-0056.000 entitled "Traffic Management Specification Version 4.0" authored by the ATM Forum Technical Committee, April 1996.

However, the ABR flow control scheme described in the above ATM Forum document describes mostly the source and destination system behaviors and leaves the switch system behavior unspecified. Although several example switch mechanisms have existed in the past, these mechanisms are either known to not work well, e.g., with fairness and stability problems, or are complicated to implement in switches, e.g., requiring accurate estimation of the ABR traffic load and fair sharing of bandwidth for each ABR connection. Furthermore, none of the switch mechanisms have analytical proof for stability and performance. Most of them were only shown to work by simulations in very small scale networks under very limited traffic conditions. In order to have a complete ABR flow control scheme for vendors to implement in existing ATM networks, it is thus very important to develop an ATM Forum compliant ABR flow control mechanism which is both easy to implement and effective in achieving the objective of ABR flow control, namely making efficient use of network resources.

SUMMARY OF INVENTION

In the subject invention, a Queue Length, QL, based ABR flow control system for an ATM switch node is utilized in which a desired cell transmission rate is calculated according to the current cell queue length build-up at the switch node. The calculated rate value is carried back to a source node via RM cells and the rate value is used by the source node to adjust its cell transmission rate.

The effectiveness of a switch ABR flow control scheme can be measured by its responsiveness, stability, and fairness. Responsiveness requires an ABR scheme to respond to network load changes quickly. Specifically, when the network traffic load increases, a switch should notify a source to reduce its transmission rate quickly to avoid further network congestion. Failure of doing this may cause switch buffer overflow and cell losses. On the other hand, when network traffic decreases, a switch should allow a source to increase its transmission rate. Failure of doing this may cause an under-utilization of network resources. Stability means that an ABR flow control scheme should not change a source's cell transmission rate too dramatically as to cause oscillations of a source's cell transmission rate. Big rate oscillations reduce a connection's quality and network bandwidth utilization. An ABR flow control scheme should also be fair to all connections so that they get equal share of network bandwidth when congestion occurs.

The subject invention improves the responsiveness of ABR flow control by setting the absolute rate value according to the cell queue length at a switch. This is in contrast to other flow control schemes which use queue length to determine the amount of increment/decrements of cell rate. To address the stability issue, the subject system uses an exponential function to convert a queue length value to a rate value. This exponential function has been proved to provide the system with a large stability region. The subject ABR flow control system achieves fairness by using the absolute rate setting, instead of incremental rate setting, and having a source system using the minimum rate set by all switches on its route. Finally, the subject invention is easy to implement in ATM switches.

In summary, in an ATM network, a traffic management system is provided to allow simple and effective implementation of rate-based available bit rate, or ABR, flow control at ATM switches. The subject system uses an innovative queue length based approach to calculate the rate that a source system can use to send cells. In one embodiment, the cell rate is calculated as an exponential function of the cell queue length at a switch, and the rate value is carried back to a source system via resource management, or RM, cells. The exponential rate calculation function provides a large stability region for a network and for better flow control performance than other systems, with subject system being easy to implement in ATM switches.

BRIEF DESCRIPTION OF DRAWINGS

These and other features of the Subject Invention will be better understood in conjunction with the Detailed Description taken in accordance with the Drawings of which.

DETAILED DESCRIPTION

Figure 1:
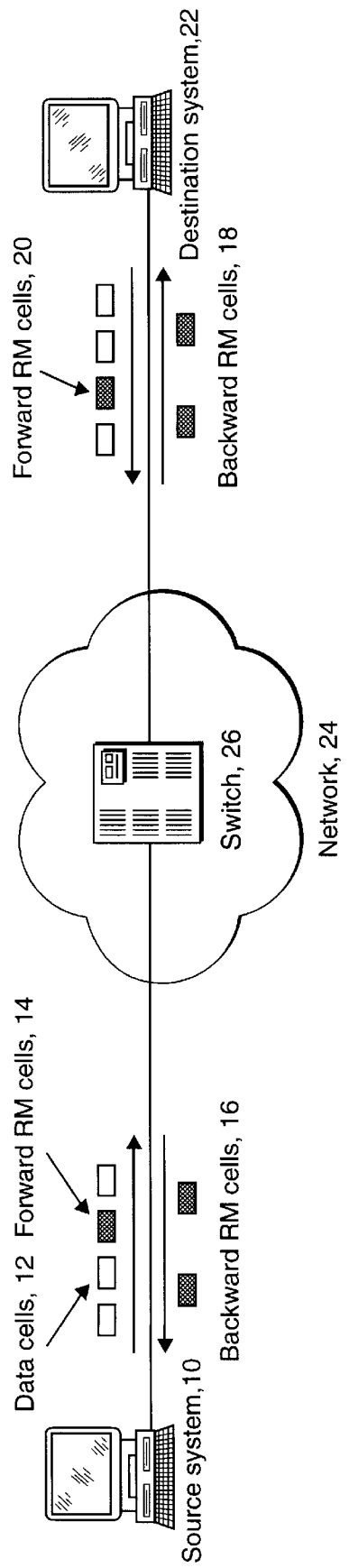
FIG. 1 is a schematic diagram illustrating an ABR flow control loop in which RM cells are generated by a source system, processed by switches in a network, and turned around by a destination system to carry network congestion information back to the source system.

Referring now to FIG. 1, transmission of digital data over an ATM network and a framework of ABR flow control is shown. An ATM network 24 with one or more switch nodes 26 is utilized to connect a source system 10 to a destination system 22. Source system 10 generates data cells 12 together with forward RM cells 14. According to the ATM Forum traffic management specification, for each ABR connection, one forward RM cell is generated in every Nrm cells transmitted, where Nrm is a parameter of the ABR connection. These cells are forwarded by one or more switch nodes 26 within the network to their destination systems 22. A destination system consumes data cells, converts forward RM cells into backward RM cells 18, and sends backward RM cells back to their source system 10 via network 24. Switch 26 writes network congestion information in the forward and/or backward RM cells. After receiving backward RM cells 16, source system 10 adjusts its cell transmission rate according to the congestion information contained in the cells, in accordance with an ATM Forum document af-tm-0056.000 entitled "Traffic Management Specification Version 4.0" authored by the ATM Forum Technical Committee, April 1996 which contains a detailed description of the ATM Forum ABR flow control specification.

Figure 2:
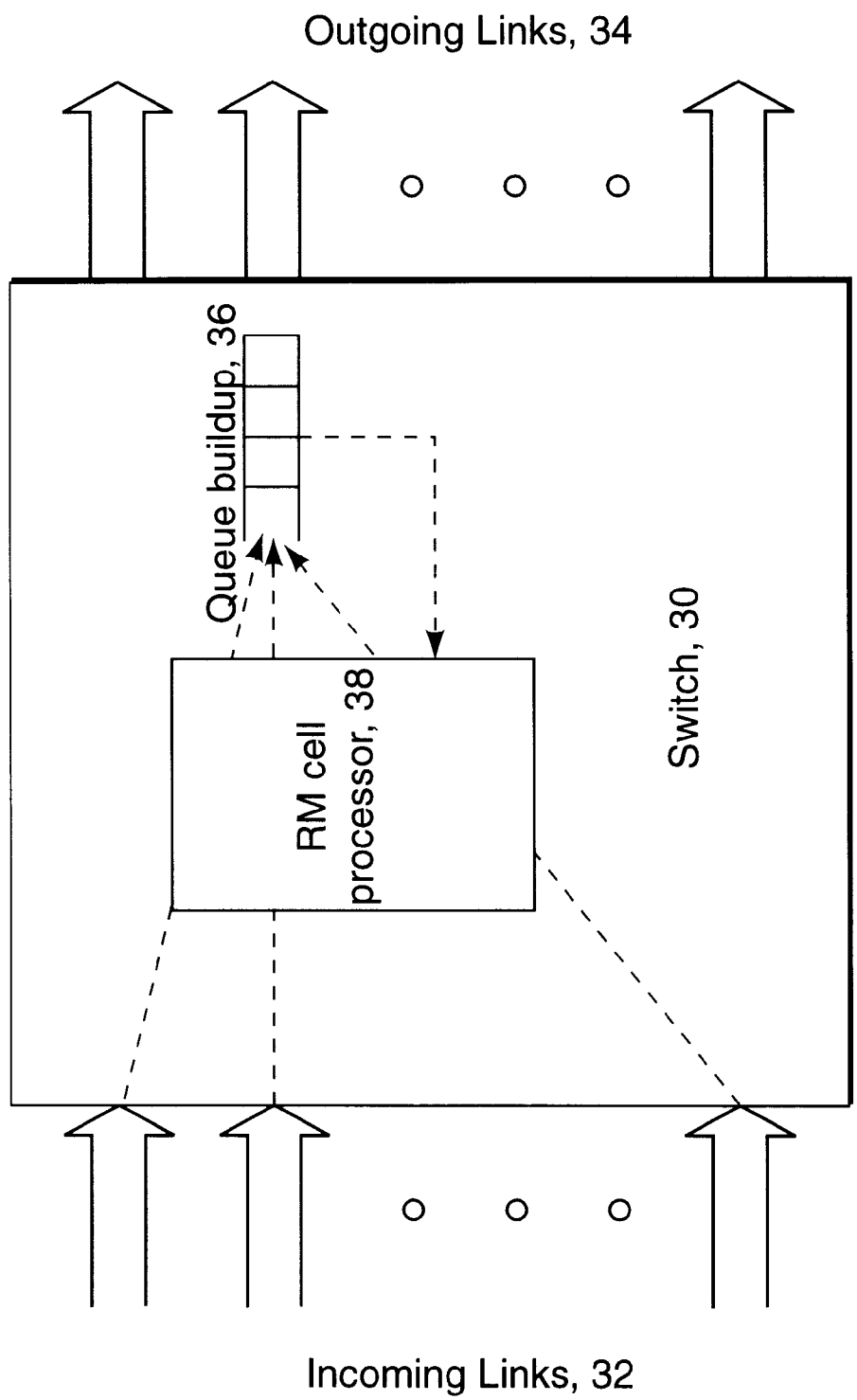
FIG. 2 is a schematic diagram illustrating an ATM switch node with incoming links, outgoing links, queue buildup at an outgoing link, and an RM cell processor within the switch.

Referring now to FIG. 2, this figure shows cell flows within a switch node 30 in an ATM network 24 of FIG. 1 and the usage of an RM cell processor 38 to perform ABR flow control functions. Data and RM cells enter switch 30 through incoming links 32 and leave the switch through outgoing links 34. When the aggregated incoming rate of cells exceeds the transmission rate of an outgoing link from which the cells leave the switch, a cell buffer 36 is needed to temporarily store cells so that they can be sent when the outgoing link bandwidth becomes available. The number of cells in the cell buffer 36, or queue length, is inputted to the RM cell processor 38. RM cell processor 38 uses this queue length information to update passing RM cells.

Figure 3:
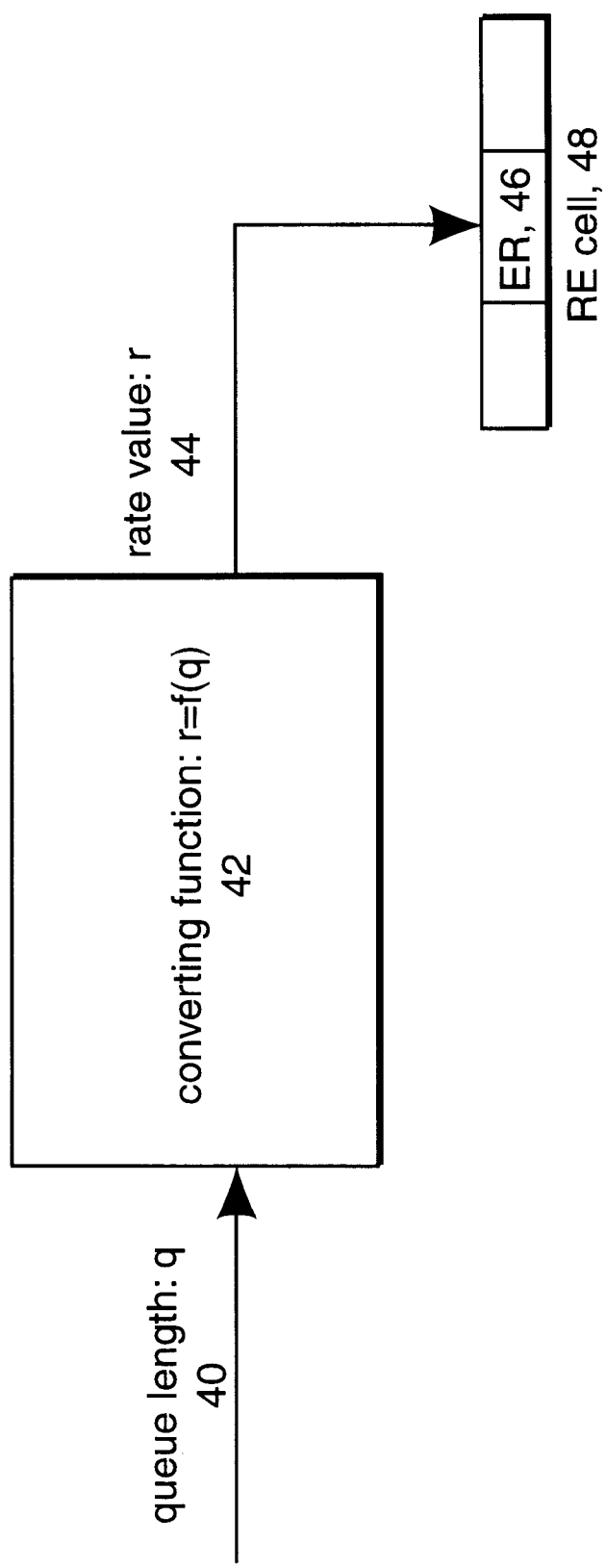
FIG. 3 is a schematic diagram illustrating the functionality of the RM cell processor of FIG. 2 that converts a queue length value into a rate value and writes the rate value into an ER field of passing RM cells.

Referring now to FIG. 3, more details about the updating of RM cells by RM cell processor 38 of FIG. 2 are discussed. As stated in the ATM Forum ABR flow control specification, when a source system receives a backward RM cell, it will adjust its cell transmission rate for the connection to be no more than the Explicit Rate, or ER, value contained in the ER field 46 of the RM cell. Thus an RM cell processor of a switch can control a source system's transmission rate via setting the ER field of passing RM cells. The subject invention requires a RM cell processor to perform one or both of the following RM cell processing functions:

First, for each forward RM cell received by the switch, the RM cell processor reads the queue length value 40 of the outgoing link from where the received RM cell is to leave the switch, converts the queue length value q into a cell rate value r 44 using a converting function 42, and if the rate value 44 is smaller than the value of ER field 48 of the RM cell, sets ER field 46 with rate value 44.

Secondly, for each backward RM cell received by the switch, the RM cell processor reads the queue length 40 value of the outgoing link from where the data cells of the same connection as the RM cells leaves the switch, converts the queue length q into a cell rate value r 44 using a converting function 42, and if the rate value 44 is smaller than the value of ER field 48 of the RM cell, sets ER field 46 with rate value 44.

The converting function 42 has a big impact on the ABR flow control performance. Inappropriate selection of a converting function may reduce the responsiveness and cause instability of ABR flow control. The subject invention uses a special exponential converting function derived from a dynamic control theory as described below.

Figure 4:
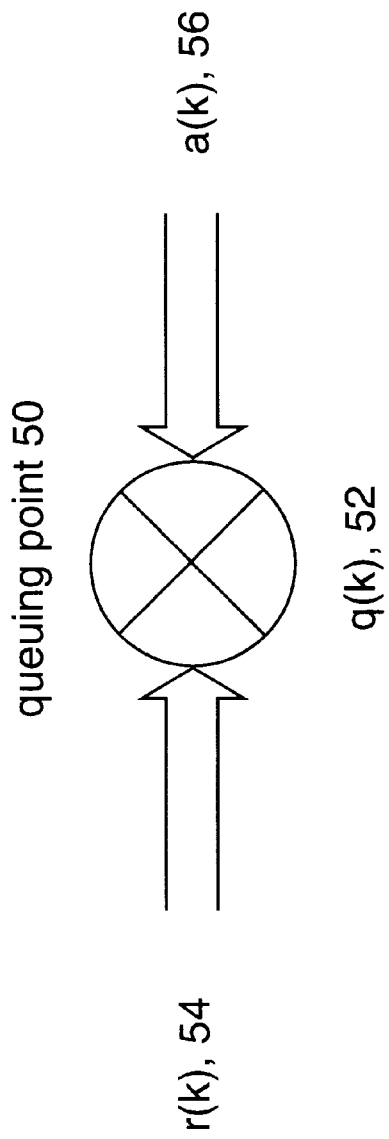
FIG. 4 is a schematic diagram illustrating a cell queuing point within a switch and associated variables used to perform stability analysis of the subject system.

Referring now to FIG. 4, queuing analysis for a connection at a queuing point 50 of an outgoing link of a switch is performed. Let t(k) denote the arrival time of the k-th RM cell of the connection. q(k) 52 is used to represent the queue length at the queuing point at time t(k). r(k) 54 and a(k) 56 are used to represent the connection's average cell arriving rate at the incoming link and the average cell departing rate at the outgoing link between time t(k) and t(k+1), respectively. Let T(k)=t(k+1)−t(k) be the RM cell arrival period. Notice that after a switch sets a rate value in an RM cell, there is a feedback delay before the switch observes a change in the incoming cell rate. In other words, it takes some time for the RM cell to get back to its source system and cells with a changed transmission rate to reach the switch. Let d(k) be this feedback delay at time t(k) in a unit of RM cell period. Specifically, the incoming cell rate at time t(k) is determined by the rate value set in the (k−d(k))-th RM cell.

To study the dynamic behavior of an ABR connection, let the queuing point shown in FIG. 4 be a bottleneck point of the connection. In other words, one can assume that the connection will send cells using the rate value set at this queuing point. With the notations shown in FIG. 4, one has the following relations:

$$q(k+1)=q(k)+T(k)(r(k)-a(k))$$

$$r(k)=f(q(k-d(k))) \quad (1)$$

The physical meaning of the above equation is that the queue length at the time when the next RM cell arrives equals the current queue length plus the cell accumulation during the current RM period, and the current cell arriving rate of the connection equals the rate value set at this queuing point d(k) RM cells ago.

With the above notations, we can now perform stability analysis of a connection under ABR flow control. Let r(k)=r, q(k)=q, T(k)=T be an equilibrium point of the connection under the condition of a(k)=a, and d(k)=d. In other words, one assumes that the system will reach a steady state with all variables illustrated in FIG. 4 stay at constant values if the bandwidth available to the connection and the feedback delay stay at constant for a sufficiently long period of time. Then stability of an ABR flow control scheme requires that if for any reason the state variables, i.e., r(k) and q(k), leave the equilibrium point, they will return to the equilibrium point again. One reason for the system to leave its current equilibrium point is due to a change in the bandwidth available to a connection, e.g., after an addition or removal of some other connections sharing the same transmission link. Thus a stable ABR flow control system will make the cell transmission rate of a connection stabilize at a new equilibrium point instead of oscillating forever.

Let $$\delta q(k)=q(k)-q$$

$$\delta r(k)=r(k)-r \quad (2)$$

be the perturbation of the queue length and cell arriving rate from their equilibrium point. From equations (1), we have $$\delta q(k+1)=\delta q(k)+T\delta r(k)$$

$$\delta r(k)=\delta'(q)\delta q(k-d) \quad (3)$$

Substituting $\delta r(k)$ into the first equation, we have $$\delta q(k+1)=\delta q(k)+Tf'(q)\delta q(k-d) \quad (4)$$

From the discrete control theory, the dynamic system (4) is stable if and only if the following equation is stable, i.e., equation (5) has roots within the unit circle:

$$Z^{d+1}-Z-Tf'(q)=0 \quad (5)$$

Using simulations, the stability condition for equation (5) can be obtained as follows:

$$f'(q) \le -\frac{g(d)}{T} \quad (6)$$

where the values of $g(d)$ as a function of the feedback

TABLE I

| | d | | | | | | | |
|---|---|---|---|---|---|---|---|---|
| | 1 | 2 | 3 | 4 | 5 | 6 | 7 | 8 |
| g(d) | 1 | 0.62 | 0.45 | 0.35 | 0.29 | 0.24 | 0.21 | 0.19 |

TABLE II

| | d | | | | | | | |
|---|---|---|---|---|---|---|---|---|
| | 9 | 10 | 11 | 12 | 13 | 14 | 15 | 16 |
| g(d) | 0.17 | 0.15 | 0.14 | 0.13 | 0.12 | 0.11 | 0.10 | 0.095 |

In an equilibrium state, Nrm cells arrive in a time period of T, where Nrm is an ABR parameter defined in the ATM Forum specification which requires a source system to send one forward RM cell in every Nrm cells sent. Thus we have the cell arrival rate:

$$r = f(q) = \frac{Nrm}{T} \quad (7)$$

Then the stability condition of (6) can be expressed as $$f'(q) \le -\frac{g(d)}{Nrm}f(q) \quad (8)$$

This leads to a rate converting function that satisfies the stability condition above:

$$r = f(q) = PCR \times e^{\left\{-\frac{g(d)}{Nrm}q\right\}} \quad (9)$$

where PCR is the peak cell rate that a connection can use to send cells as defined by the ATM Forum specification.

Figure 5:
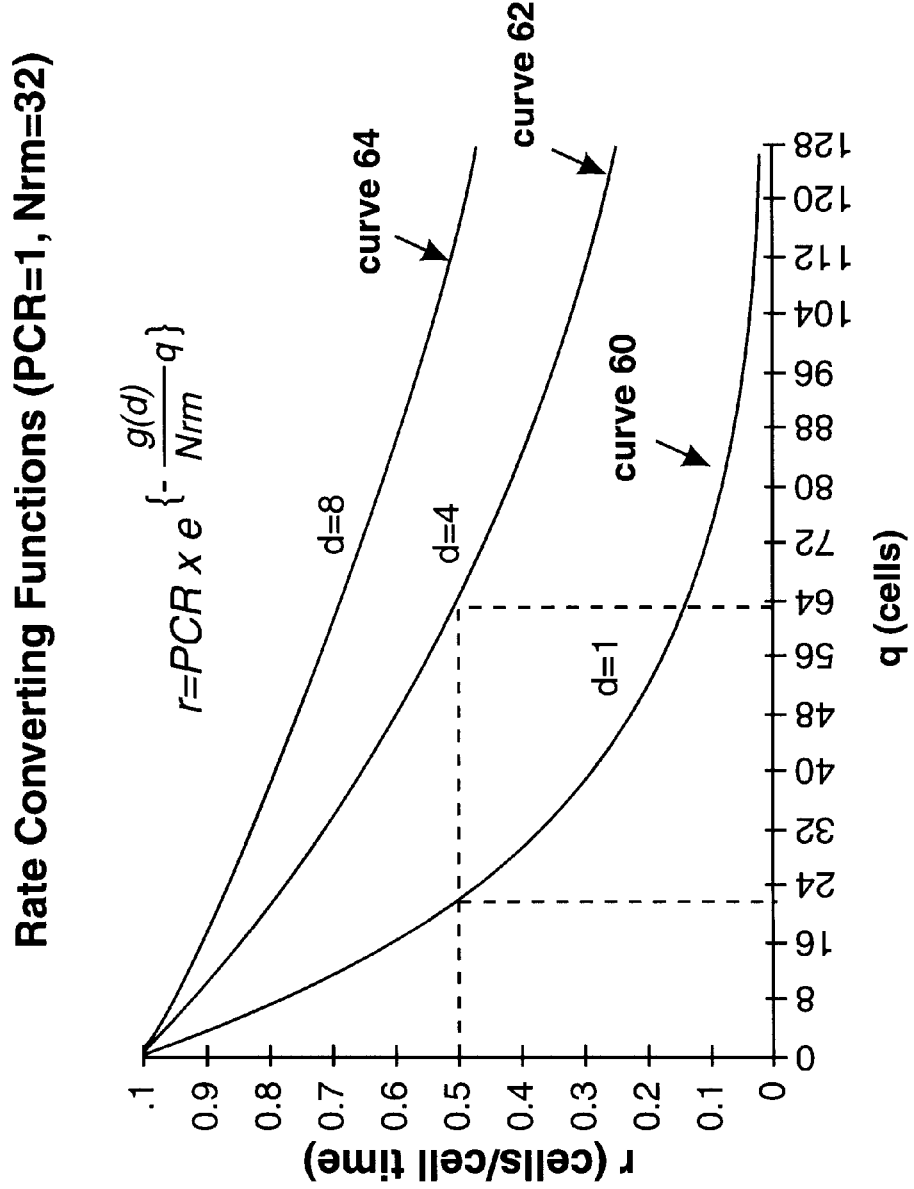
FIG. 5 is a diagram showing the rate converting functions with different values of RM cell feedback delay.

Referring now to FIG. 5, several examples of the rate converting function with different values of feedback delay are shown. If curve 60 is used as the rate converting function, then it is guaranteed that the subject ABR flow control scheme is stable as long as the feedback delay is no larger than the RM period T. Similarly, if one uses curve 62 or curve 64 as the rate converting function, it is guaranteed that the system is stable as long as the feedback delay is no larger than 4T or 8T. From the stability consideration, a large d should be used in selecting a rate converting function at a switch since this gives a large stability region of the actual feedback delay. However, a large d also increases the buffer requirement at a switch. For example, one can see from FIG. 5 that for d=1, a buffer of 22 cells is needed to throttle the transmission rate of a connection to half of its peak bandwidth PCR. If d is increased to 4, a buffer of 64 cells is needed to support the same transmission rate.

Figure 6:
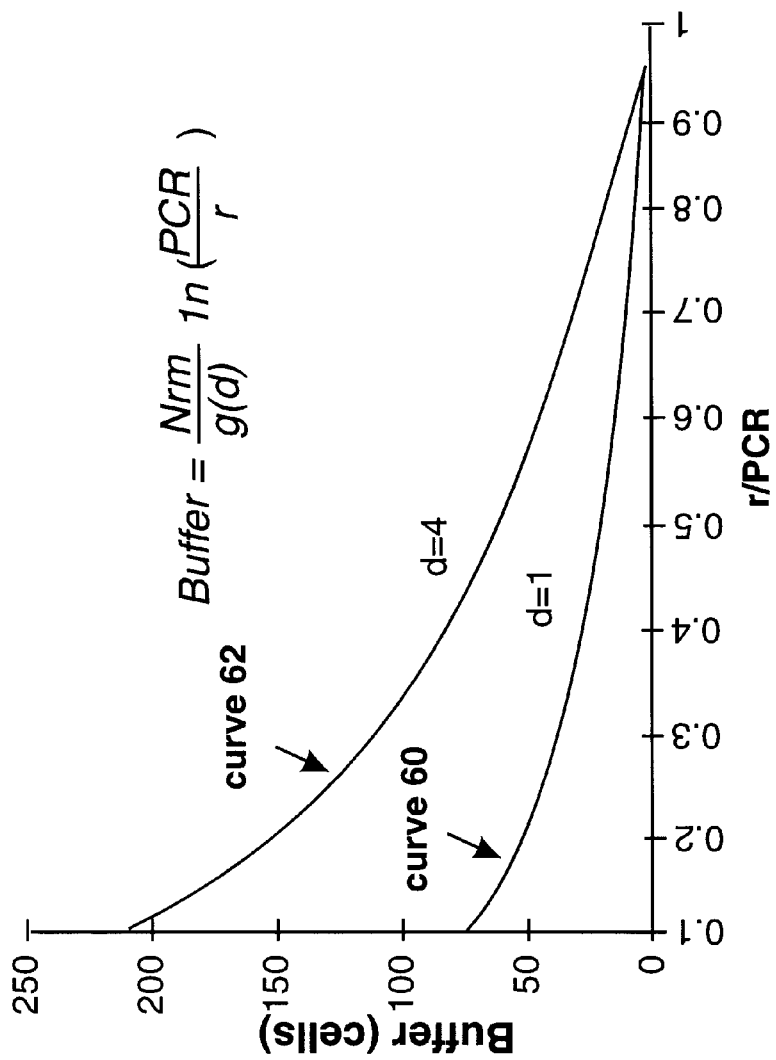
FIG. 6 is a diagram showing the switch buffer requirements with the subject flow control system; and, FIG. 7 is a schematic diagram illustrating an example implementation of the subject system in a switch with a central buffer architecture, also showing a processor on a CPU card performing the rate converting function and RM cell processing at switch line cards.

Referring now to FIG. 6, the buffer requirement at a switch is shown. Curve 70 and curve 72 illustrate two examples with d=1 and d=4, respectively. This relationship can be used to determine the amount of buffer needed to support ABR flow control, or to determine the maximum feedback delay d one can support with a given amount of buffer at a switch.

One interesting fact to observe from FIG. 6 is that the minimum rate a switch can support with a given amount of buffer and a d selection depends on the peak cell rate, PCR. A large PCR value allows a connection to ramp up to a high transmission rate when a network is not heavily loaded. However, from FIG. 6, it also requires more buffer at a switch to throttle the transmission rate of a connection when a network is heavily loaded. One way to increase the rate adjustment range of a switch with a given amount of buffer is to set the PCR dynamically by using an estimated bandwidth available to the connection. For example, PCR can be set to the value of bandwidth available to the ABR traffic divided by the number of active ABR connections sharing the bandwidth. Another way is to reduce the PCR when the queue length reaches some predefined thresholds, and increase PCR when the queue length falls below some predefined thresholds. It should be noted that the queue length thresholds should not be set to be too close to each other. Otherwise, it would be equivalent to reducing the feedback value d which affects the stability of the scheme.

Figure 7:
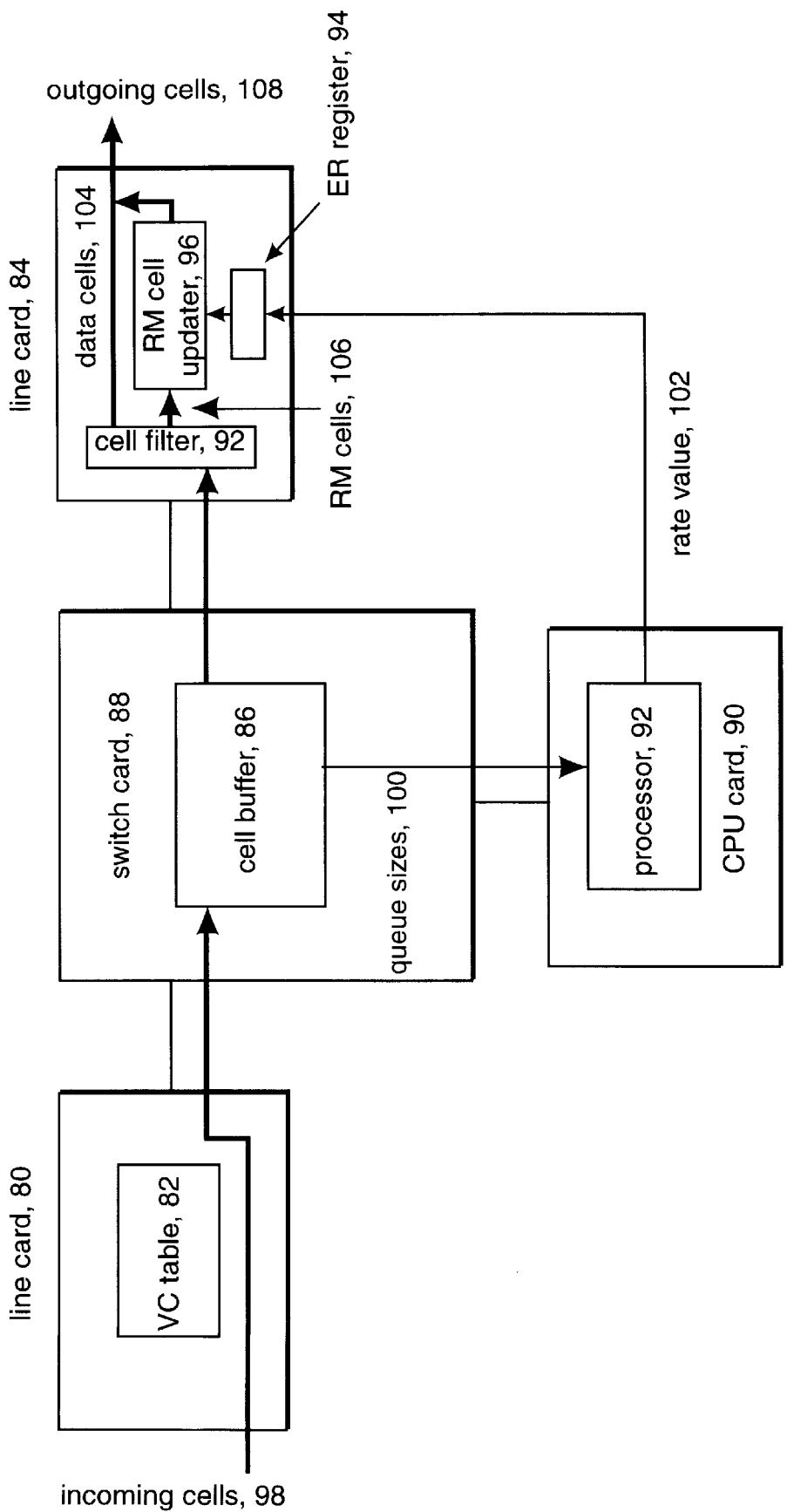

Referring now to FIG. 7, an implementation of the subject ABR flow control system in an ATM switch with a central shared buffer architecture is presented. Incoming cells 98 arrive at a line card 80 which modifies the cell headers according to information stored in a VC table 82. These cells are then forwarded to a switch card 88 and stored in a central cell buffer 86. When outgoing bandwidth is available, cells stored in cell buffer 86 are forwarded to a corresponding line card 84 and leave the switch as outgoing cells 108. For each outgoing link, switch card 88 maintains a queue length value which records the number of cells currently residing in cell buffer 86 that are destined for the outgoing link. Processor 92 in CPU card 90 periodically reads queue sizes 100 from switch card 88 for all outgoing links of the switch. These queue size values are then converted to rate values using a rate converting function as illustrated in FIG. 5 by processor 92. The calculated rate value is written in an ER register 94 of its corresponding line card 84. When cells are transferred from switch card 88 to line card 84, ordinary data cells 104 are transmitted by the line card without changes. When RM cells 106 are detected by cell filter 92, they are routed to RM cell processor 96. The RM cell processor compares the ER field in the RM cell with ER register 94. If the value in the ER field of the RN cell is larger than the value stored in the ER register 94, the rate value in the ER register is written into the ER field of the RM cell. Otherwise, the RM cell remains unchanged. The RM cell is then transmitted by the line card.

It should be noted that the above described RN cell processing can be performed for both forward and backward RM cells. For a forward RM cell, the length of the cell queue destined for the outgoing link from where the RM cell is transmitted is used to calculate the rate value. For a backward RM cell, the length of the cell queue destined for the outgoing link from where the forward RM cells of the same connection is transmitted is used to calculate the rate value. Thus if backward RM cells are to be processed at a switch, multiple ER registers 94 will be needed with each storing a rate value corresponding to an outgoing link of the switch.

For switches with an output buffer architecture where cells are queued at each outgoing line card instead of a central switch card, the function of converting a queue size value to a rate value can be performed at each individual line card, either periodically or at a time an RM cell is to be transmitted. To support backward RM cell processing, line cards need to communicate periodically so each line card knows the rate values of all outgoing links Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In an ATM network having a source system, a destination system and at least one switch node, a system for traffic management comprising:

a switch node within said network for transferring cells from said source system to said destination system thus to provide a connection therebetween, said switch node including an incoming link for receiving cells, an outgoing link for transmitting cells, and a cell buffer for temporarily storing cells within said switch node in a cell queue;

a rate converter at said switch node for ascertaining the queue length of said cell queue to obtain an explicit rate value; and means responsive to said explicit rate value for adjusting the cell transmission rate at said source system by setting the rate of transmission of the cells transmitted thereby.

2. The rate converter of claim 1, wherein said cell rate r is calculated as an exponential function of the said queue length q:

$$r = f(q) = PCR \times e^{\{-q/N\}}$$

where PCR is the peak cell rate for the said connection, and N is a parameter used for the said rate converter.

3. The rate converter of claim 2, wherein the parameter N is set to ensure the stability of the rate control system under a given RM cell feedback delay d and RM cell generation frequency Nrm in accordance with:

$$N = \frac{Nrm}{g(d)}$$

where g(d) is specified in the table on page 13.

4. The rate converter of claim 1 and further including a means for setting the peak cell rate according to the outgoing bandwidth available to a connection.

5. The rate converter of claim 1 and further including means for setting the peak cell rate according to the number of cells in said cell queue.

* * * * *